US010557440B2

(12) United States Patent
Atkins (10) Patent No.: US 10,557,440 B2
(45) Date of Patent: Feb. 11, 2020

(54) INTERNAL COMBUSTION ENGINE (71) Applicant: Ricardo UK Limited, Shoreham-by-Sea (GB)

(72) Inventor: Andrew Farquhar Atkins, Shoreham-by-Sea (GB)

(73) Assignee: Ricardo UK Limited (GB)

( * ) Notice: Subject to any disclaimer, the term of this patent is extended or adjusted under 35 U.S.C. 154(b) by 180 days.

(21) Appl. No.: 15/500,184

(22) PCT Filed: Jul. 31, 2015

(86) PCT No.: PCT/GB2015/052232
§ 371 (c)(1),
(2) Date: Jan. 30, 2017

(87) PCT Pub. No.: WO2016/016664
PCT Pub. Date: Feb. 4, 2016

(65) Prior Publication Data
US 2017/0306890 A1    Oct. 26, 2017

(30) Foreign Application Priority Data
Jul. 31, 2014   (GB) .................................. 1413591.7

(51) Int. Cl.
*F02M 21/02*    (2006.01)
(52) U.S. Cl.
CPC .... *F02M 21/0206* (2013.01); *F02M 21/0215* (2013.01); *F02M 21/0227* (2013.01); *F02M 21/0275* (2013.01); *F02M 21/0287* (2013.01)

(58) Field of Classification Search
CPC .......... F02M 21/0206; F02M 21/0215; F02M 21/0287
See application file for complete search history.

(56) References Cited

U.S. PATENT DOCUMENTS 5,566,712 A     10/1996  White et al.
5,769,610 A  *   6/1998  Paul ........................ F02B 63/06
                                                              417/228

(Continued)

FOREIGN PATENT DOCUMENTS

EP         2650521 A1    10/2013
JP      2012122423 A     6/2012
(Continued)

OTHER PUBLICATIONS

Improved concept of hydrogen on-board storage and supply for automotive applications; International Journal of Hydrogen Energy, vol. 15, Issue 1, 1990, pp. 27-32; T. Krepec, D. Miele, C. Lisio.

(Continued)

*Primary Examiner* — Kevin A Lathers
(74) *Attorney, Agent, or Firm* — Lerner, David, Littenberg, Krumholz & Mentlik, LLP (57) ABSTRACT

A method of operating an internal combustion engine comprising a cylinder and a piston, the method including injecting into the cylinder, as a liquid, a fuel which has been condensed into its liquid phase via a refrigeration process, such that the fuel vaporises into its gaseous phase during a compression stroke of the piston and before combustion such that a rise in temperature caused by the compression stroke is limited by the absorption of heat by the fuel.

20 Claims, 7 Drawing Sheets (56) References Cited

U.S. PATENT DOCUMENTS

| | | | |
|---|---|---|---|
| 6,161,525 A * | 12/2000 | Ficht | F02B 23/101 123/495 |
| 2012/0031371 A1 | 2/2012 | Sabathil | |
| 2013/0247885 A1 | 9/2013 | Fukuyama et al. | |
| 2013/0306029 A1 * | 11/2013 | Stockner | F02M 21/0245 123/445 |
| 2014/0116390 A1 | 5/2014 | Foege | |

FOREIGN PATENT DOCUMENTS

| KR | 20120064815 | 6/2012 |
|---|---|---|
| WO | 2016016664 | 2/2016 |

OTHER PUBLICATIONS

International Search Report for PCT/GB2015/052232 dated Nov. 26, 2015.
Combined Search and Examination Report for GB1413591.7 dated Aug. 15, 2014.

* cited by examiner

INTERNAL COMBUSTION ENGINE

CROSS REFERENCE TO RELATED APPLICATIONS

The present application is a national phase entry under 35 U.S.C. § 371 of International Application No. PCT/GB2015/052232, filed Jul. 31, 2015, published in English, which claims priority from United Kingdom Patent Application No. 1413591.7, filed Jul. 31, 2014, the disclosures of which are incorporated by reference herein.

FIELD OF THE INVENTION

The present disclosure relates to a method of operating an internal combustion engine.

BACKGROUND

In an internal combustion engine using the Otto cycle, an inlet air/fuel mixture is compressed adiabatically before ignition. Compression of the inlet air/fuel mixture causes a corresponding increase in temperature resulting from the energy input during compression. Increasing the compression ratio in the cylinder is an approach that has been followed to increase the efficiency of such engines. However, by increasing the compression ratio in the cylinder, the temperature of the air/fuel mixture in the cylinder increases, and can lead to engine knock or in some circumstances pre-ignition, having damaging effects on the engine.

In such engines, sub-optimal charge conditions in the cylinder can result in sub-optimal combustion, which can lead to, for example, incomplete combustion resulting in slip, poor efficiency or knock that in extreme cases can have deleterious effects on the engine.

SUMMARY

Aspects and embodiments of the invention are set out in the appended claims.

DRAWINGS

Embodiments of the disclosure will now be described, by way of example only, with reference to the accompanying drawings, in which.

SPECIFIC DESCRIPTION

Aspects of the disclosure relate to an internal combustion engine 100 configured to inject a fuel, which has been condensed into its liquid phase via a refrigeration process, in liquid form such that the fuel vaporises into its gaseous phase during a compression stroke and before combustion such that a rise in temperature caused by the compression stroke is limited by the absorption of heat by the fuel.

Aspects of the disclosure also relate to a method of operating an internal combustion engine comprising injecting a fuel, which has been condensed into its liquid phase via a refrigeration process, in liquid form such that the fuel vaporises into its gaseous phase during a compression stroke and before combustion such that a rise in temperature caused by the compression stroke is limited by the absorption of heat by the fuel For example, a phase change of the fuel limits a rise in temperature caused by the compression stroke, for example the latent heat of vaporisation of the fuel as it vaporises. Advantageously this may allow the use of higher compression ratios than possible with conventional Otto cycle engines without suffering from engine knock or pre-ignition.

The fuel may be injected directly into a cylinder 3 of the engine 100, for example the combustion chamber 27 of the cylinder 3. Because any temperature rise in the air caused by the compression is limited by the absorption of heat by the fuel, injecting the fuel in the liquid phase means that it is less likely that the engine 100 will suffer from pre-ignition as the temperature in the combustion chamber 27 of the cylinder 3 remains cooler than a conventional Otto cycle engine.

Additionally, because the fuel vaporises in the combustion chamber 27 of the cylinder 3 during the compression stroke, it results in better mixing of the fuel with the air, for example due to the boiling action of the liquid fuel leading to high turbulence in the cylinder 3, allowing the engine 100 to run leaner.

Vaporisation of the fuel during the compression stroke also reduces the compression work of the compression stroke. This is because the fuel limits a rise in temperature caused by the compression stroked, and as a result less heat is lost to the walls of the cylinder 3. In conventional Otto cycle engines, the fuel needs to be "gasified" for it to be in a useful form for it to combust and produce work, thus requiring energy and reducing engine efficiency. In embodiments of the disclosure however, because the fuel has vaporised during the compression stroke, it is already in a gaseous form and therefore advantageously removes the need for gasification of the fuel prior to use.

In some embodiments the rate of the flow of fuel is controlled such that the absorption of heat by the fuel is commensurate with the instantaneous temperature difference between the fuel and surrounding air in the cylinder 3.

In some embodiments the fuel is injected into the cylinder 3 after an air intake stroke and/or during a compression stroke. In this way, the fuel is injected into the cylinder such that it vaporises in the combustion chamber 27 of the cylinder 3 during a compression stroke of the at least one piston 25.

The fuel may be stored under pressure, for example at least 1 MPa, for example at least 1.6 MPa, and/or at a low temperature, for example below 273 Kelvin, for example below 150 Kelvin, for example to approximately 111 Kelvin, such that it is in the liquid phase when it is injected into the cylinder 3.

Figure 1:
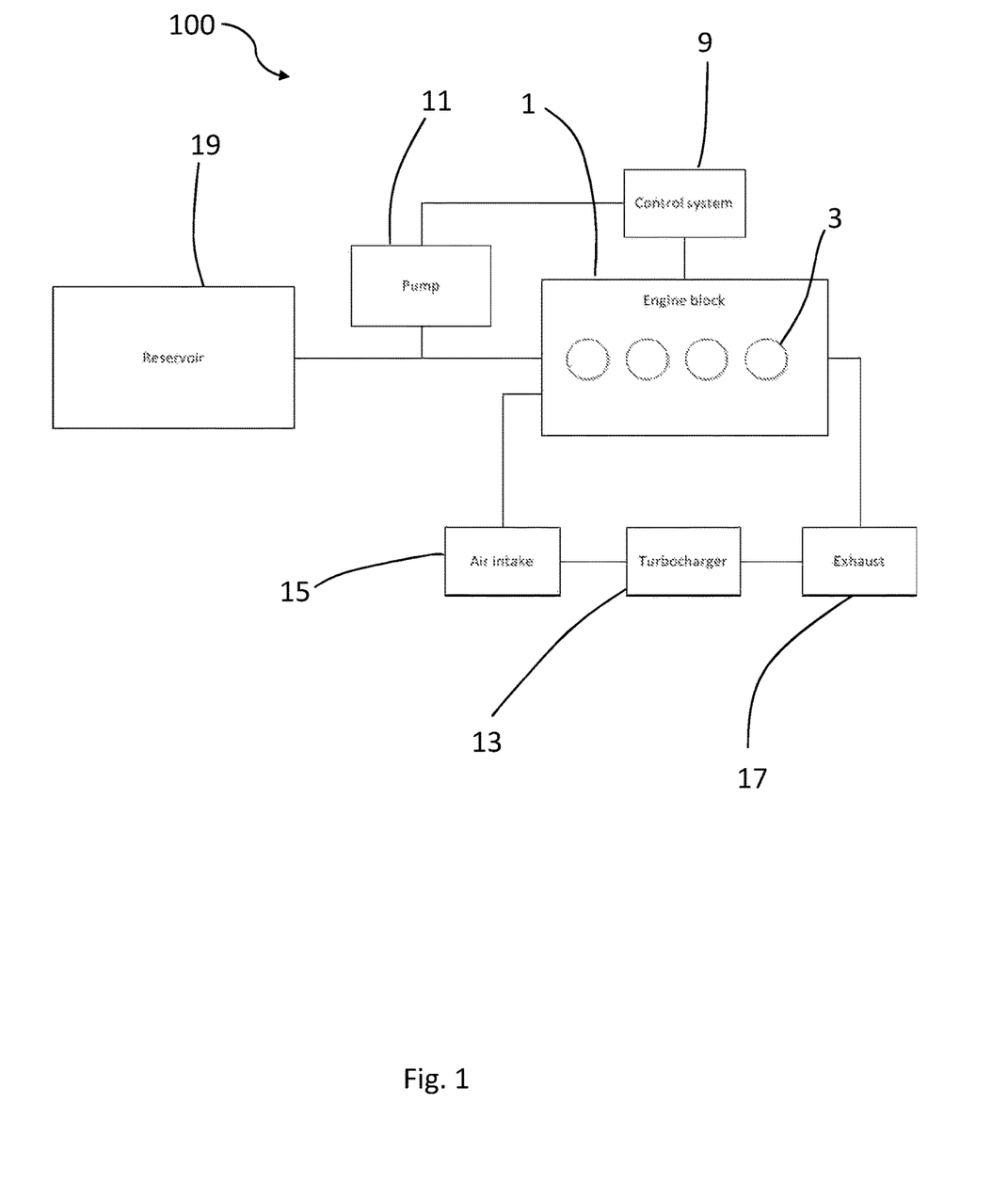
FIG. 1 shows a schematic diagram of an internal combustion engine.

An example embodiment will now be described with reference to FIGS. 1 to 7. FIG. 1 illustrates an internal combustion engine 100. The internal combustion engine 100 comprises an engine block 1 comprising four cylinders 3, however in some embodiments the engine block 1 may comprise more or less than four cylinders 3. Coupled to the engine block 1 is a control system 9.

A pump 11 is coupled to the engine block 1 and a reservoir 19, and is in fluid communication with both the reservoir 19 and engine block 1. Turbocharger 13 is also coupled to the engine block 1 and is in fluid communication with the engine block 1. The turbocharger 13 is coupled to, and in fluid communication with, an air intake 15 and an exhaust 17. In some embodiments however, the engine 100 does not comprise a turbocharger 13, and may instead comprise a supercharger or may not comprise any means to charge the air before intake by the engine block 1.

The control system 9 is operable to control operation of the pump 11, the engine block 1 and the cylinders 3, the turbocharger 13, the air intake 15 and the exhaust 17. The control system may be an electronic system, for example a computer, that comprises sensors and feedback loops to continuously monitor and control certain aspects of the engine 100.

The reservoir 19 is thermally insulated comprising a vacuum space so that it is configured to store and hold a quantity of fuel which has been condensed into its liquid phase via a refrigeration process, and which in this case is liquid natural gas, LNG, at a low temperature, for example below 273 Kelvin, for example below 150 Kelvin, for example to approximately 111 Kelvin, and therefore the fuel may be a cryogen. In some embodiments, the fuel comprises methane, hydrogen (LH2) or ethane.

The pump 11 is operable to pump fuel from the reservoir 19 to the engine block 1, as described in more detail below and with reference to FIG. 5. The turbocharger 13 is operable to extract energy from exhaust gases coming from outlets 7 of cylinders 3 to inject air drawn through air intake 15 and through the inlets 5 into the combustion chambers 27 of cylinders 3, and to expel air exhaust gases from the outlets 7 of the cylinders 3 and through exhaust 17.

Figure 2:
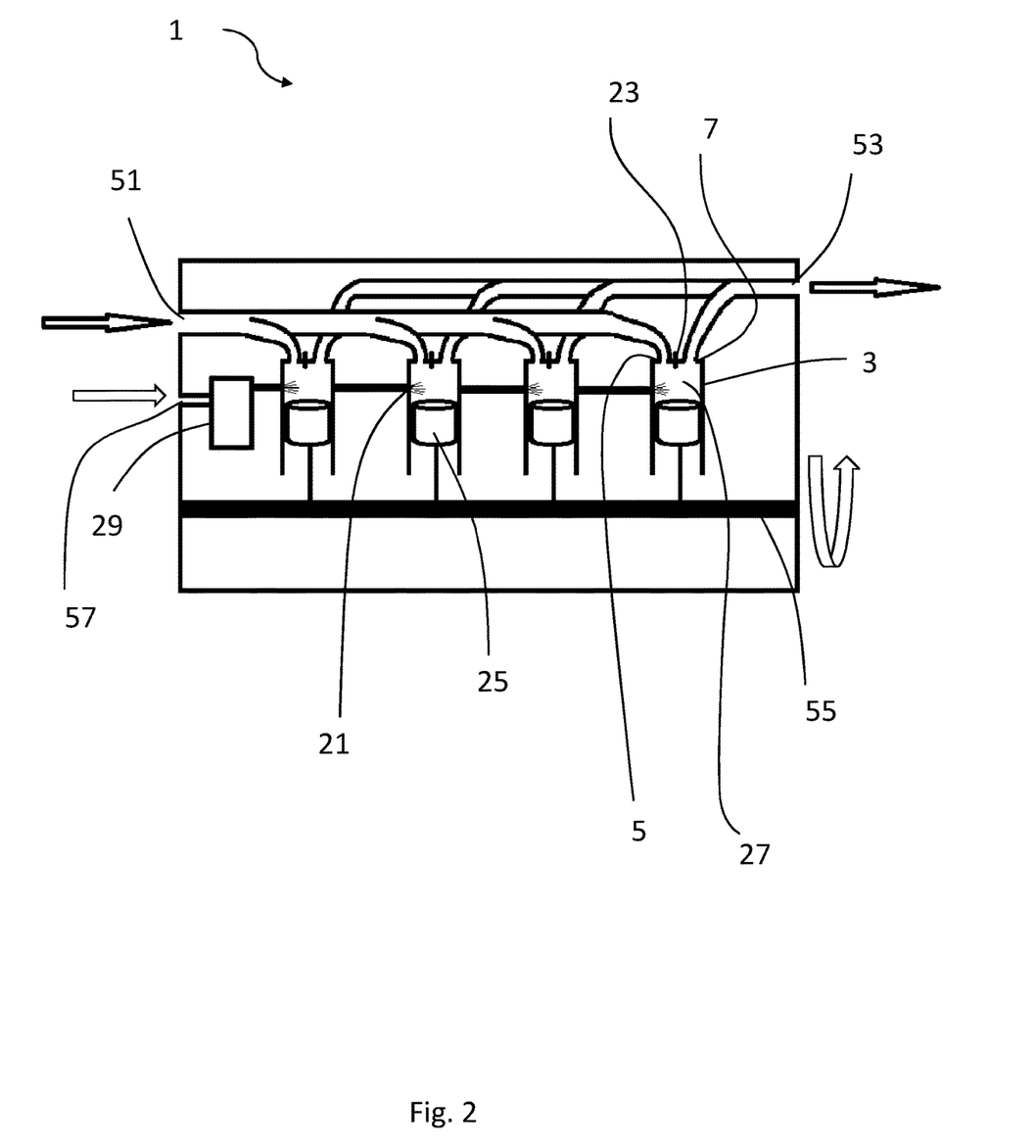
FIG. 2 shows a sectional view of an engine block of the internal combustion engine shown in FIG. 1.

The engine block 1 is shown in more detail in FIG. 2. The engine block comprises an air inlet manifold 51 and an air outlet manifold 53. The air inlet manifold 51 is in fluid communication with the turbocharger 13 and the air intake 5 of the cylinders 3. The air outlet manifold 53 is also in fluid communication with the turbocharger 13 and the air outlet 7 of the cylinders 3.

The engine block 1 further comprises a fuel inlet manifold 57 and a fuel injection system 29. The fuel inlet manifold 57 is coupled to, and in fluid communication with, the pump 11 and the fuel injection system 29. The fuel injection system 29 is in turn coupled to, and in fluid communication with, an injector 21 of each cylinder 3. The fuel injection system 29 may, for example, comprise a low pressure pump, or may comprise a common rail system.

Each cylinder 3 comprises an air inlet 5, an air outlet 7, an injector 21, an ignition source 23 and a piston 25. The piston 25 is slidably received within the cylinder 3 to enclose the combustion chamber 27 of the cylinder 3 and is coupled to a crankshaft 55. Each piston 25 of the four cylinders 3 of engine block 1 is coupled to the same crankshaft 55, although in some embodiments different pistons 25 may be coupled to different crankshafts 55. The inlet 5 and outlet 7 are located in the top of the cylinder 3 either side of the ignition source 23 and comprise valves operable to provide openings to the combustion chamber 27 of the cylinder 3. The ignition source 23 may comprise, for example, a spark plug, a glow plug or a plasma generator.

The piston 25 is operable to compress air in the combustion chamber 27 of the cylinder 3. Movement of the piston 25 in the cylinder 3 moves the crankshaft 55 coupled to the piston 25. The control system 9 is operable to control the movement of the piston 25 and timings of when the inlets 5 open and close, when the outlets 7 open and close, when the injection system 29 and injectors 21 inject fuel into the combustion chamber 27 and when the ignition source 23 is operated to create an ignition. The injection system 29 injects fuel directly into the combustion chamber 27 of the cylinder 3 through the injectors 21, and the ignition source 23 is operable to ignite the fuel in the combustion chamber 27 of the cylinder 3. The inlets 5 are operable to admit air into the combustion chamber 27, and the outlets 7 are operable to remove waste gases (exhaust) from the combustion chamber 27. For example, the inlets 5 and outlets 7 may be mechanically or electronically operated valves, with their opening and closing times being controlled by the control system 9.

Figure 3:
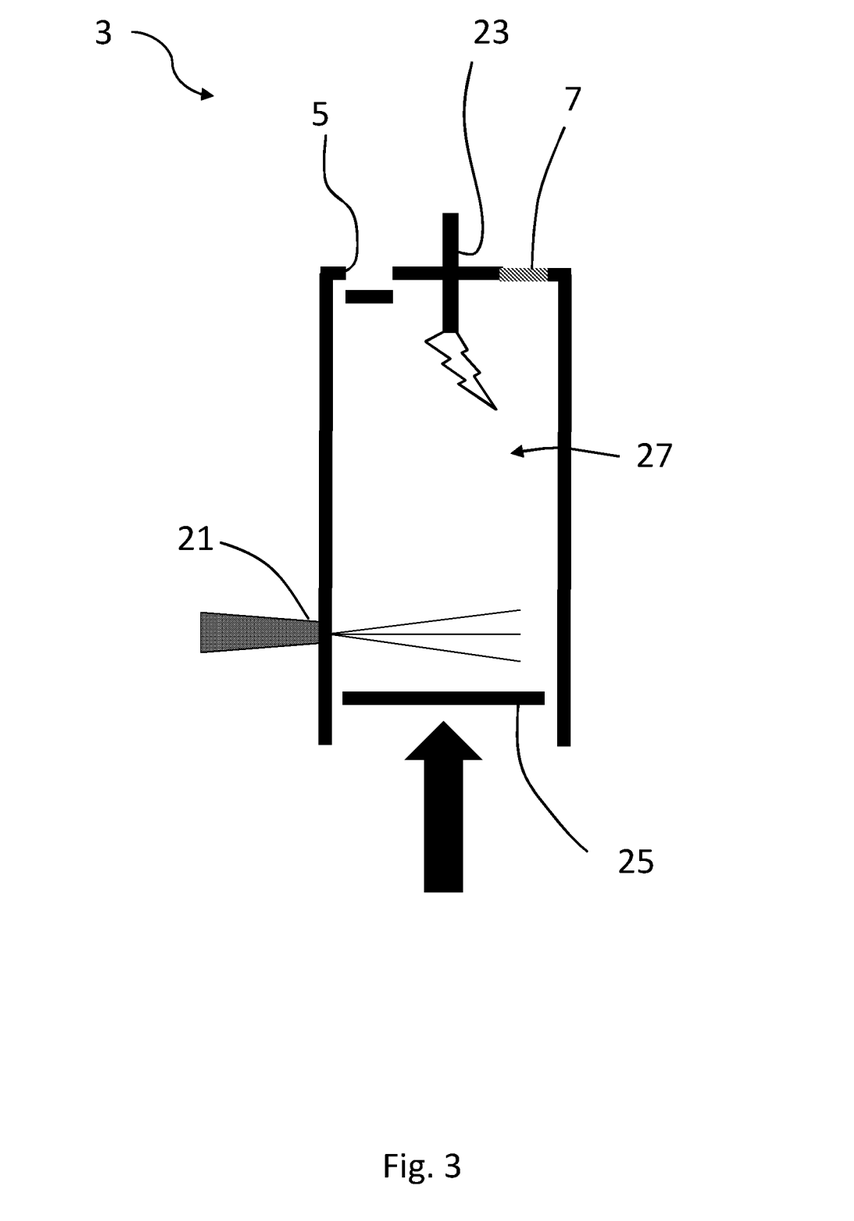
FIG. 3 shows a sectional view of a cylinder in an engine block of the internal combustion engine shown in FIG. 1.
Figure 4:
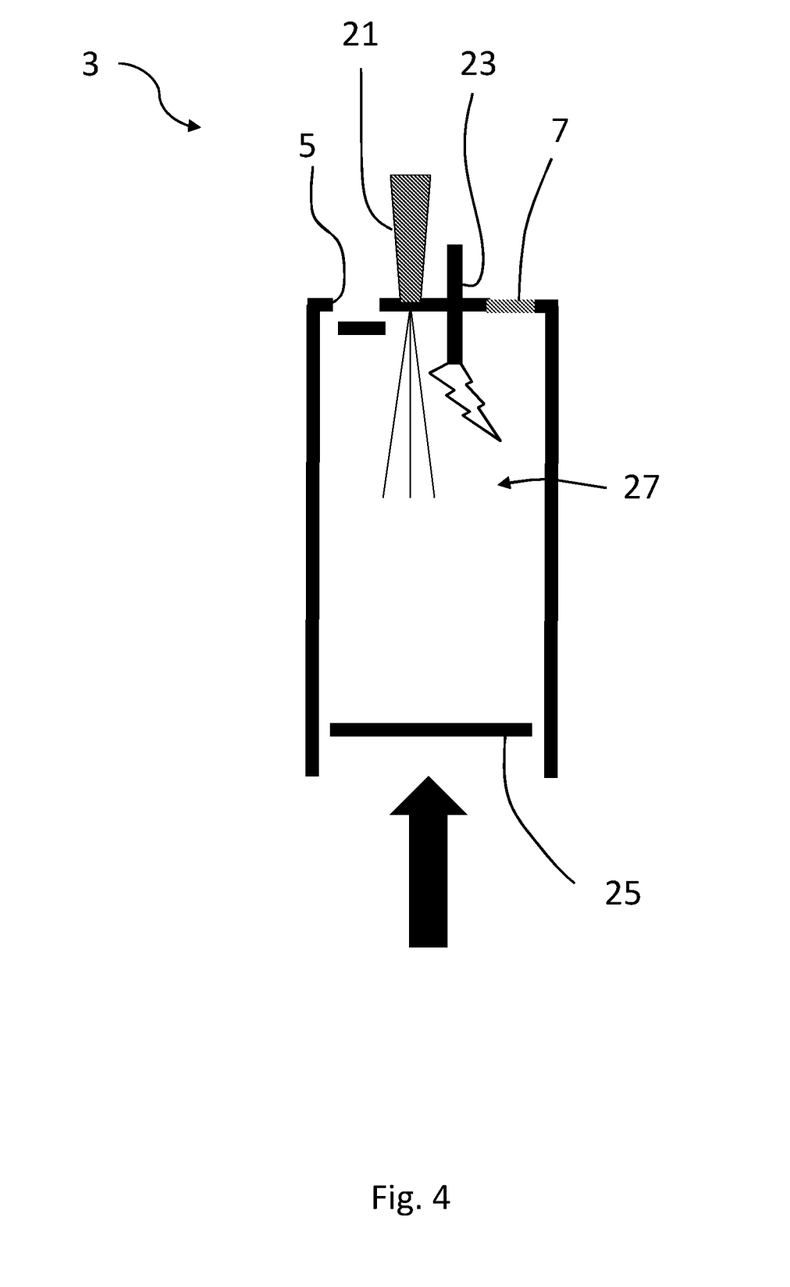
FIG. 4 shows a sectional view of an alternative arrangement of a cylinder of an engine block of the internal combustion engine shown in FIG. 1.

Example cylinders 3 are shown in more detail in FIGS. 3 and 4. In one configuration, shown in FIG. 3, the injector 21 passes through the side of the cylinder wall, such that the injector is operable to inject fuel into the cylinder 3 in a plane transverse to the direction of motion of the piston 23. Advantageously, injecting the fuel in this way through the side wall of the cylinder 3 provides better mixing of the fuel with air in the combustion chamber 27, and also may shield the injector 21 from the hot gas during the ignition/combustion phase or power stroke.

In another configuration, shown in FIG. 4, the injector 21 passes through the top of the cylinder wall between the inlet 5 and outlet 7 adjacent to the ignition source 23. Other configurations of the location of the injector 21 may be possible.

The operation of the cylinder 3, the piston 25, the inlet 5, the outlet 7, the injector 21 and the ignition source 23 will now be described in more detail with reference to FIG. 5. FIG. 5 shows a timing diagram showing pressure in the combustion chamber 27 of cylinder 3 and valve/injection timings with respect to piston 23 position. Specifically, FIG. 5 shows four cycles of the internal combustion engine 1 corresponding to the Otto cycle. Each cycle can be described with reference to a position of the piston 25 within the cylinder 3 (Top Dead Centre (TDC) or Bottom Dead Centre (BDC)) or with reference to an angular position of the crankshaft 55 coupled to the piston 25.

The cycle begins when the piston 25 is at TDC and the angular position of the crankshaft is at 0 degrees. As the crankshaft 55 rotates it draws the piston 25 downwards from TDC until it reaches BDC and the crankshaft has rotated 180 degrees. This is called the intake stroke. At the beginning of the intake stroke the inlet 5 and outlet 7 are both open. The outlet 7 closes when the crankshaft 55 has rotated, for example, between 10 and 30 degrees as shown by reference 1 in FIG. 5. The injector 21 begins injecting fuel into the combustion chamber 27 in the liquid phase, for example when the outlet 7 has closed, shortly after the outlet 7 has closed, or sometime after the outlet 7 has closed, as shown by reference 6 in FIG. 5.

After the piston 25 has reached BDC and as the crankshaft 55 continues to rotate, the piston 25 travels upwards from BDC back to TDC and compresses air and fuel in the combustion chamber 27. This is called the compression stroke. Typically the inlet 5 closes, for example, between 10 and 30 degrees after the piston 25 reaches BDC, for example when the crankshaft 55 has rotated 190 to 210 degrees, as shown by reference 2 in FIG. 5. The injector 21 typically stops injecting fuel when the piston 25 is, for example 10 to 30 degrees before reaching TDC, for example when the crankshaft 55 has rotated approximately 330 to 350 degrees, as shown by reference 7 in FIG. 5.

Depending upon the configuration of the engine and the control system 9, typically the engine is configured such that the ignition source 23 ignites the fuel in the combustion chamber 27 just before the piston 25 reaches TDC, for example between 30 to 10 degrees before TDC, for example when the crankshaft 55 has rotated between 330 and 350 degrees. This is shown by reference 5 in FIG. 5.

Figure 5:
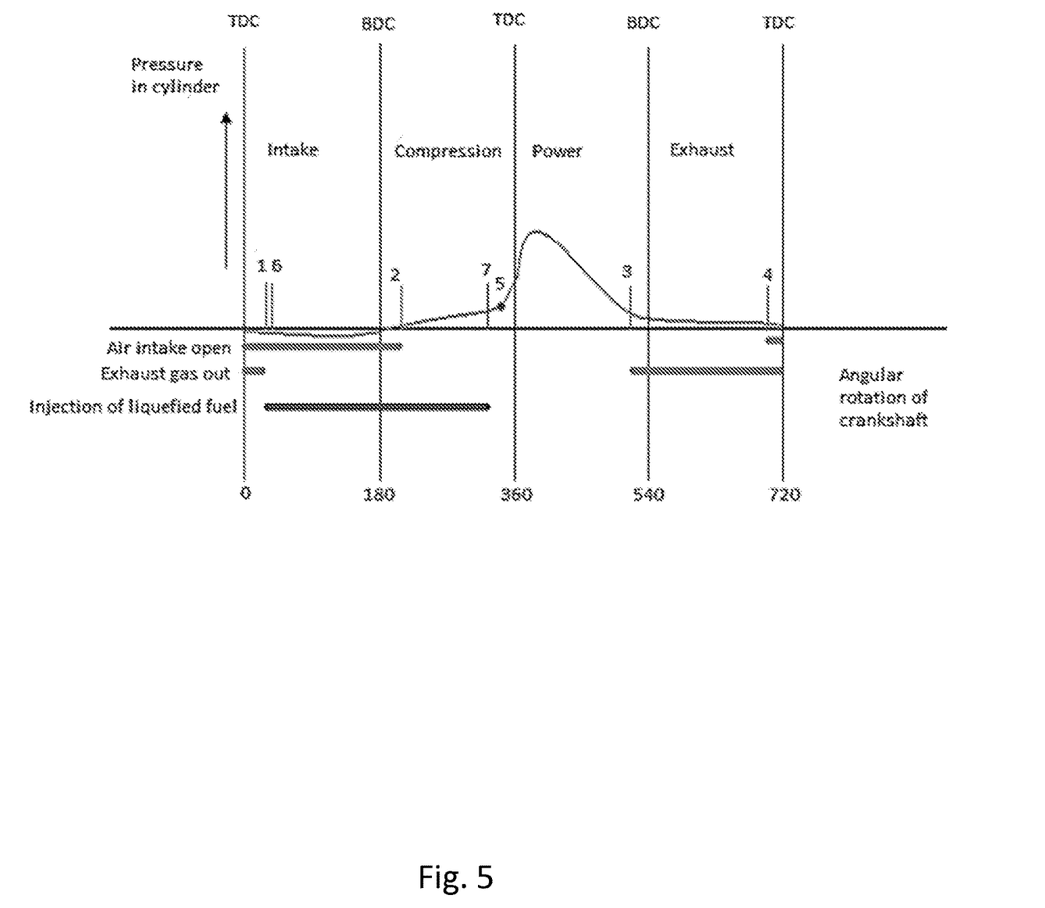
FIG. 5 shows a timing diagram showing pressure and valve/injection timings with respect to piston position.

As the fuel ignites and combusts, the pressure in the combustion chamber 27 of the cylinder 3 rapidly rises such that it reaches a peak pressure just after the piston 25 has reached TDC, for example approximately 10 to 30 degrees beyond TDC when the crankshaft 55 has rotated approximately 370 to 390 degrees, as shown in FIG. 5. The pressure increase in the combustion chamber 27 forces the piston 25 back down towards BDC. This is called the power stroke.

As the piston 25 once again reaches BDC, the outlet valve 7 opens to let exhaust gases and waste products escape the combustion chamber 27. The outlet valve 7 may open from approximately 10 to 30 degrees before BDC, for example when the crankshaft 55 has rotated approximately 510 to 530 degrees, as shown by reference 3 in FIG. 5. The piston 25 then travels back up towards TDC as the crankshaft 55 continues to rotate. This is called the exhaust stroke. Just before the piston 25 reaches TDC again, the inlet 5 opens to allow air to enter to the combustion chamber 27. For example, the inlet 5 opens between 10 and 30 degrees before TDC, for example when the crankshaft 55 has rotated between 690 and 710 degrees, as shown by reference 4 in FIG. 5.

The control system 9 and the fuel injection system 29 are configured to inject the fuel directly into the combustion chamber 27 of the cylinder 3 at a low pressure, for example less than 10 MPa, for example less than 5 MPa, for example less than 4.6 MPa, for example less than 1.3 MPa. Injecting the fuel at a low pressure means that the fuel can be injected directly into the combustion chamber 27 in the liquid phase and in the form of a spray of droplets but with a large distribution in droplet sizes. Having a large distribution in droplet sizes is thermodynamically favourable because it spreads out the temperature and/or time range over which the fuel vaporises into the gaseous phase during the compression stroke of the piston 25.

In some embodiments, the injection of the spray of droplets is controlled to deliver a distribution of droplet sizes to provide steady heat absorption during the compression stroke, and a smooth heat transfer between the air in the cylinder 3 and the liquid fuel. In some embodiments, this will comprise determining the distribution of droplet sizes that will provide heat absorption throughout the compression stroke, for example throughout a portion of the compression stroke or throughout the entire compression stroke.

The combination of the low temperature of the fuel and the low pressure at which it is injected means that the fuel is injected into the combustion chamber 27 of the cylinder 3 in the liquid phase even when the temperature of the engine is high, for example after it has been running for a while and is at approximately 360 to 380 Kelvin.

In a conventional engine using the Otto cycle, fuel is injected during the air intake stroke, for example either through the air intake itself using a carburetor, or directly into the combustion chamber 27 at high pressures (for example in the region of 100 MPa) and consequently in the gaseous phase. In other words, fuel is injected when the crankshaft 55 is, for example, between 690 degrees and 210 degrees. In these conventional engines using the Otto cycle the fuel also has not been liquefied but is already a liquid at standard room temperature and pressure (288.15 Kelvin and 101.325 kPa), yet is injected in the gaseous phase due to the high pressures and temperatures involved (for example 200 to 300 kPa).

As explained above, such conventional engines using the Otto cycle may suffer from pre-ignition and engine knock. However, injecting fuel into the cylinder 3, and in particular the combustion chamber 27, in the liquid phase, such that it vaporises into the gaseous phase during a compression stroke of the at least one piston 25, means that these problems are much less likely to occur because any temperature rise in the air in the combustion chamber 27 caused by compression during the compression stroke is limited by the absorption of heat by the fuel as it vaporises.

Such conventional engines using the Otto cycle also typically result in uneven burning of fuel due to uneven mixing of fuel with air (stratification). By contrast, because embodiments of the present disclosure inject fuel in the liquid phase, better mixing of the fuel with the air occurs as the fuel is vaporised by compression of the air in the combustion chamber 27 during the compression stroke, allowing the engine to run leaner.

The control system 9 and/or the injection system 29 have a number of sensors and feedback loops to ensure that the fuel is injected into the combustion chamber 27 of the cylinder 3 in the liquid phase. The control system 9 and/or the injection system 29 for example may include temperature sensors and pressure sensors to monitor the ambient temperature of the cylinder 3 or the engine block 1. The control system 9 and/or the injection system 29 may include pressure and temperature sensors to monitor the pressure and temperature of the reservoir 19. The control system 9 and/or the injection system 29 may also include feedback loops to adjust the timing of the inlet 5, the outlet 7, the injector 21 and the ignition source 23.

In some embodiments, the rate of the flow of liquid fuel is controlled such that the absorption of heat by the fuel is commensurate with the instantaneous temperature difference between the fuel and the surrounding air in the cylinder 3, for example the air in the combustion chamber 27.

Figure 6A:
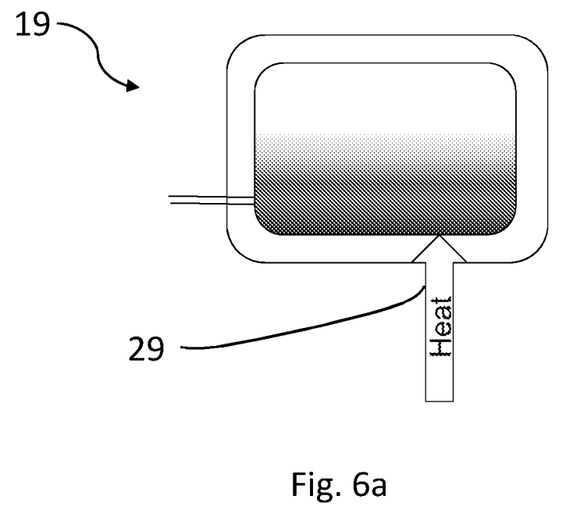
FIG. 6a shows a reservoir for use with the internal combustion engine shown in FIG. 1.
Figure 6B:
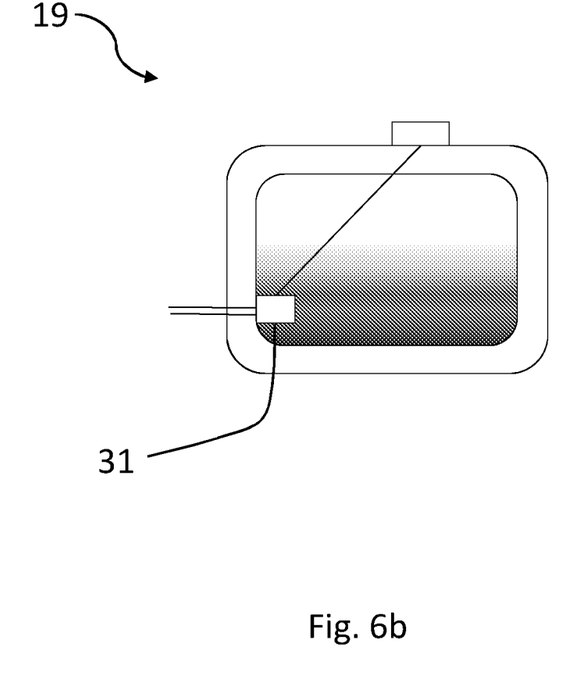
FIG. 6b shows an alternative arrangement of a reservoir for use with the internal combustion engine shown in FIG. 1.

In some embodiments, the engine 100 does not comprise a pump 11. For example, as shown in FIG. 6a, in some embodiments the engine 100 comprises a heat source 29 to heat the reservoir 19 to drive the fuel from the reservoir 19 to the engine block 1. By heating the reservoir 19, the pressure in the reservoir 19 increases such that fuel is driven towards the engine block 1. The heat source may provide heat through induction or conduction, for example from waste heat from the engine 100, for example from the exhaust gases, or may be a resistor, a glow plug, or may be radiantly across a vacuum space if the reservoir has one. In other embodiments, the reservoir 19 may itself comprise an impellor pump 31 as shown in FIG. 6b. The impellor pump 29 may be driven by an externally driven mechanical pump. In some embodiments, an electrically driven direct drive system is used.

Figure 7:
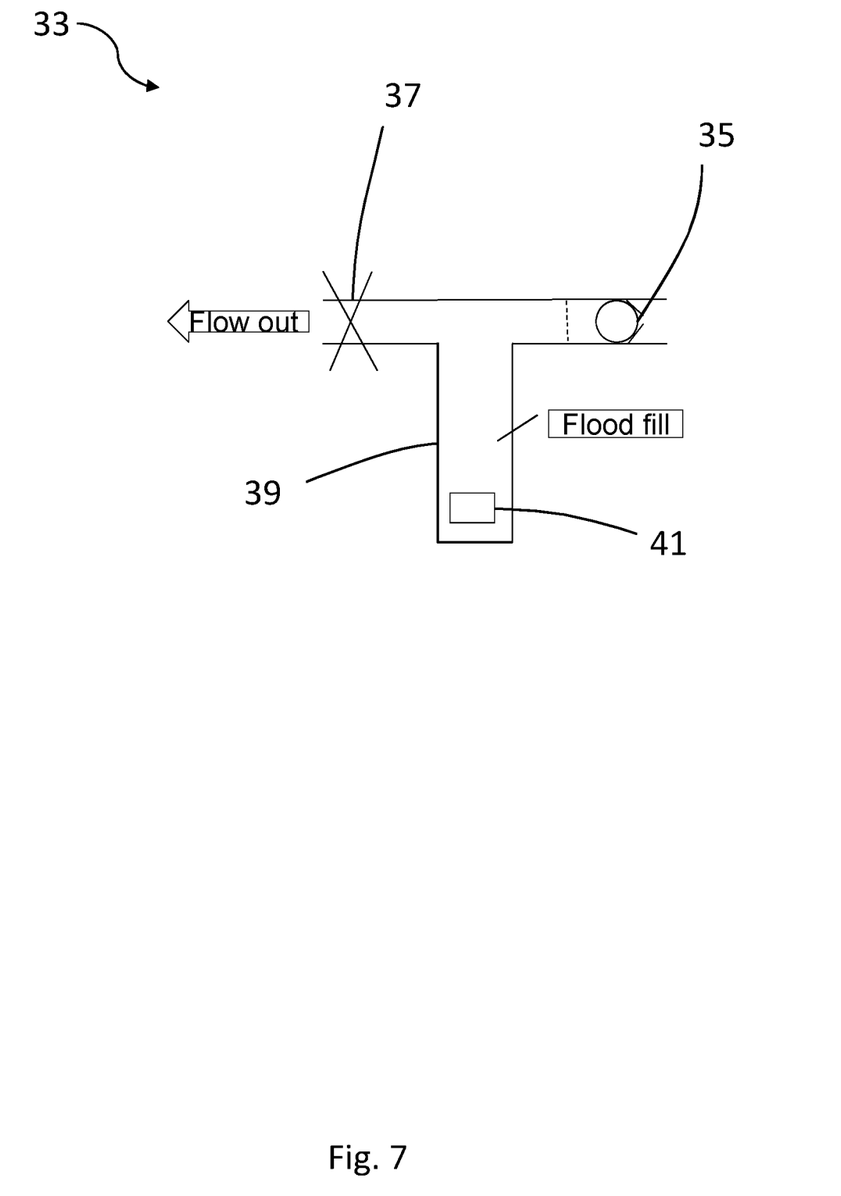
FIG. 7 shows an arrangement for driving fuel into a cylinder of the engine block of the internal combustion engine shown in FIG. 1.

In some embodiments, the heat source 29 is used in combination with overflow passage 33, as shown in FIG. 7. The overflow passage 33 is coupled to the reservoir 19 via an inlet passage 35, and coupled to the engine block 1 via an outlet passage 37, both having valves to control the flow of fuel to/from the overflow passage 33. Between the inlet passage 35 and the outlet passage 37 is a well 39 comprising a heat source 41. As fuel is driven out of the reservoir 19 it enters the overflow passage 33 via inlet 35 and flows into the well 39. Once in the well, the fuel is heated by the heat source 41. The heat source 41 may provide heat through induction or conduction, for example from waste heat from the engine 100, for example from the exhaust gases, or heat source 41 may be a resistor, a glow plug or a spark plug. Raising the temperature of a portion of the fuel increases the pressure of the fuel in the overflow passage, such that when the valve in the outlet passage 37 is open it is driven towards the engine block 1.

The fuel may be injected by means of common rail injection. In some embodiments the fuel is injected into the combustion chamber in the form of a liquid flow. In some embodiments the fuel is injected as part of the air intake, for example into the air inlet 5 or the air inlet manifold 57, or using a carburetor.

In some embodiments the reservoir 19 is configured to store the fuel under pressure, for example at least 1 MPa, for example at least 1.6 MPa. For example, the reservoir 19 may comprise reinforced walls. For example the fuel may be stored at a low temperature and under pressure.

In some embodiments, the control system 9 is configured so that the injector 21 only injects fuel into the combustion chamber 27 during the compression stroke. In some embodiments, the control system 9 is configured so that the injector 21 only injects fuel into the combustion chamber 27 during the intake stroke.

In some embodiments the outlet 7 closes before the inlet 5 opens, for example so that the outlet 7 closes at the end of the exhaust stroke, and the inlet 5 opens at the beginning of the intake stroke.

In some embodiments the internal combustion engine 100 is a dual fuel engine. For example, in some embodiments the fuel may be injected into the combustion chamber 27 along with another fuel, for example diesel.

In some embodiments, fuel is injected into some cylinders 3 of the engine block 1, and a different fuel is injected into the other cylinders 3 of the engine block 1. For example, the fuel may be injected into two cylinders 3 of the engine block 1, and diesel injected in a different two cylinders 3 of the engine block 1.

Although an Otto cycle engine has been described above, in some embodiments a compression-ignition engine, or diesel engine, may be used.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The methods and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

Embodiments of the disclosure provide computer program products, and computer readable media, such as tangible non-transitory media, storing instructions to program a processor to perform any one or more of the methods described herein.

In the context of the present disclosure other examples and variations of the apparatus and methods described herein will be apparent to a person of skill in the art.

The invention claimed is:

1. A method of operating an internal combustion engine comprising a cylinder and a piston, the method comprising injecting into the cylinder, as a liquid in the form of a spray of droplets, a fuel which has been condensed into its liquid phase via a refrigeration process, such that the fuel vaporises into its gaseous phase during a compression stroke of the piston and before combustion such that a rise in temperature caused by the compression stroke is limited by the absorption of heat by the fuel, wherein the injection of fuel is controlled to provide a selected amount of heat absorption in the cylinder.

2. The method of claim 1, comprising controlling the injection of the spray to deliver a distribution of droplet sizes to provide steady heat absorption during the compression stroke.

3. The method of claim 2, comprising determining the distribution of droplet sizes that will provide heat absorption throughout the compression stroke.

4. The method of claim 1, comprising injecting the fuel after an air intake stroke of the piston.

5. The method of claim 1, comprising injecting the fuel during the compression stroke.

6. The method of claim 1, comprising housing the fuel in reservoir, wherein injecting the fuel into the cylinder comprises at least one of (i) heating a portion of the fuel in the reservoir to create a pressure differential in the reservoir which drives a portion of the fuel towards the cylinder and (ii) using a pump to drive a portion of the fuel from the reservoir into the cylinder.

7. The method of claim 1, comprising injecting the fuel through a side wall or the head of the cylinder.

8. The method of claim 1, wherein the fuel is the sole or primary fuel source for the internal combustion engine.

9. The method of claim 1, wherein the fuel is liquid natural gas, LNG, or liquid hydrogen, LH2.

10. A controller configured to perform the method of claim 1.

11. The method of claim 1, comprising controlling the rate of injection of fuel such that fuel injected at said controlled rate provides the selected amount of heat absorption in the cylinder.

12. The method of claim 1, comprising controlling the rate of injection of fuel such that the absorption of heat by the fuel is commensurate with the instantaneous temperature difference between the fuel and surrounding air in the cylinder.

13. The method of claim 1, comprising injecting the fuel at a pressure of 1.3 MPa or less.

14. An internal combustion engine comprising:
a cylinder and a piston;
a reservoir for holding, in liquid form, a fuel which has been condensed into its liquid phase via a refrigeration process;
a liquid injector for injecting fuel from the reservoir into the cylinder; and
a control system configured to control injection, in liquid form, of the fuel into the cylinder such that the fuel vaporises into its gaseous phase during a compression stroke of the piston and before combustion such that a rise in temperature caused by the compression stroke is limited by the absorption of heat by the fuel, wherein the control system is configured to control injection of the fuel such that the fuel is injected in the form of a spray of droplets, wherein the control system is configured to control the injection of fuel to provide a selected amount of heat absorption in the cylinder.

15. The internal combustion engine of claim 14, wherein the control system is configured to cause injection the fuel during the compression stroke.

16. The internal combustion engine of claim 14, comprising a heater arranged to heat a portion of the reservoir in response to a control signal from the control system to create a pressure differential in the reservoir to drive a portion of the fuel towards the cylinder.

17. The internal combustion engine of claim 14, comprising a pump arranged drive fuel from the reservoir into the cylinder in response to a control signal from the control system.

18. The internal combustion engine of claim 14, wherein the injector is arranged to inject the fuel into the cylinder through a side wall or the head of the cylinder.

19. The internal combustion engine of claim 14, wherein the fuel is the sole or primary fuel source for the internal combustion engine.

20. The internal combustion engine of claim 14, wherein the fuel comprises liquid natural gas, LNG, or liquid hydrogen, LH2.

* * * * *